Nov. 28, 1967    B. J. ROUND ETAL    3,354,948
FLUID COOLED TUBE SUPPORT AND METHOD OF MAKING SAME
Filed Oct. 21, 1965    2 Sheets-Sheet 2
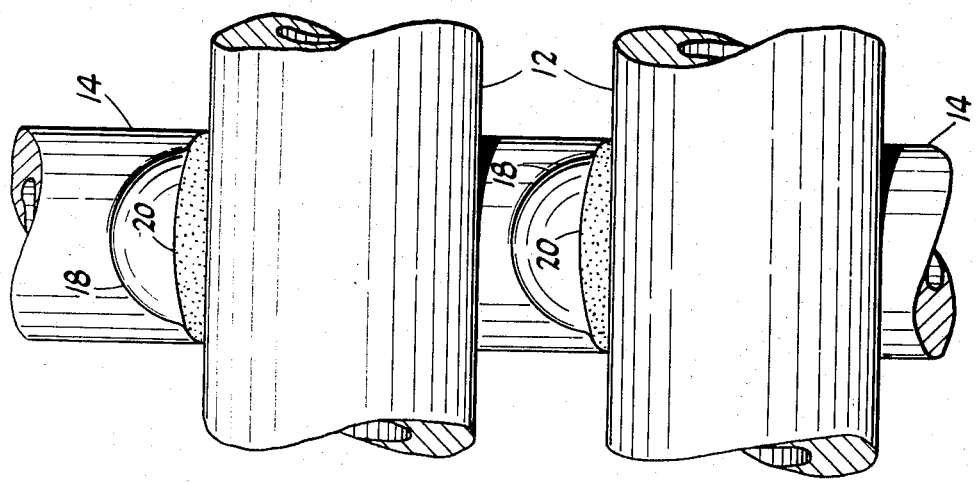
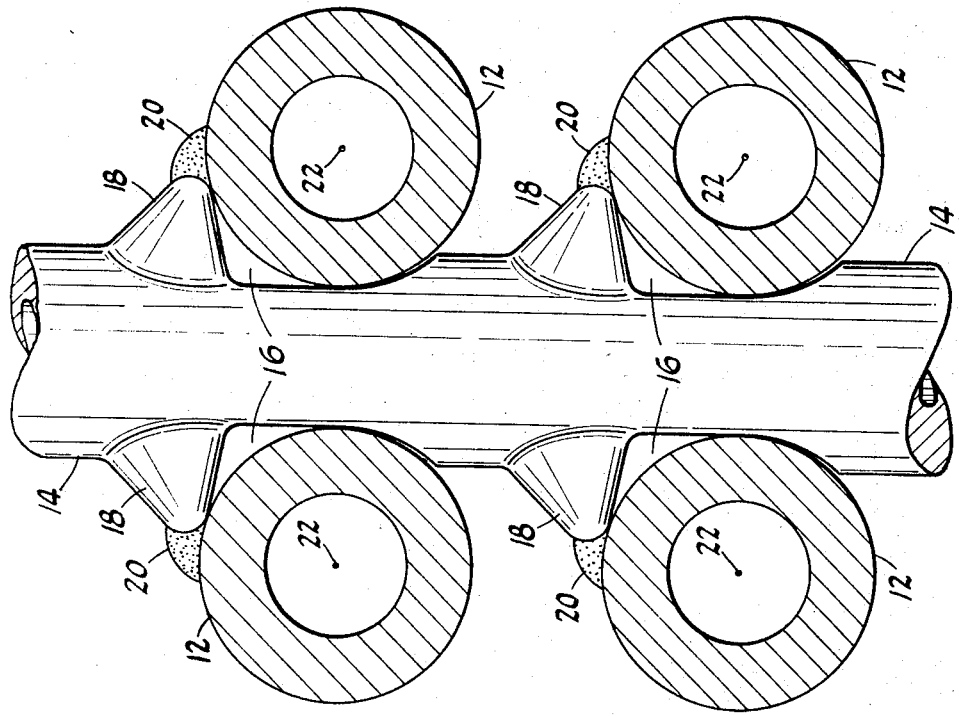
BYRON J. ROUND
WILLIAM G. BENZ JR.
INVENTORs
BY
AGENT

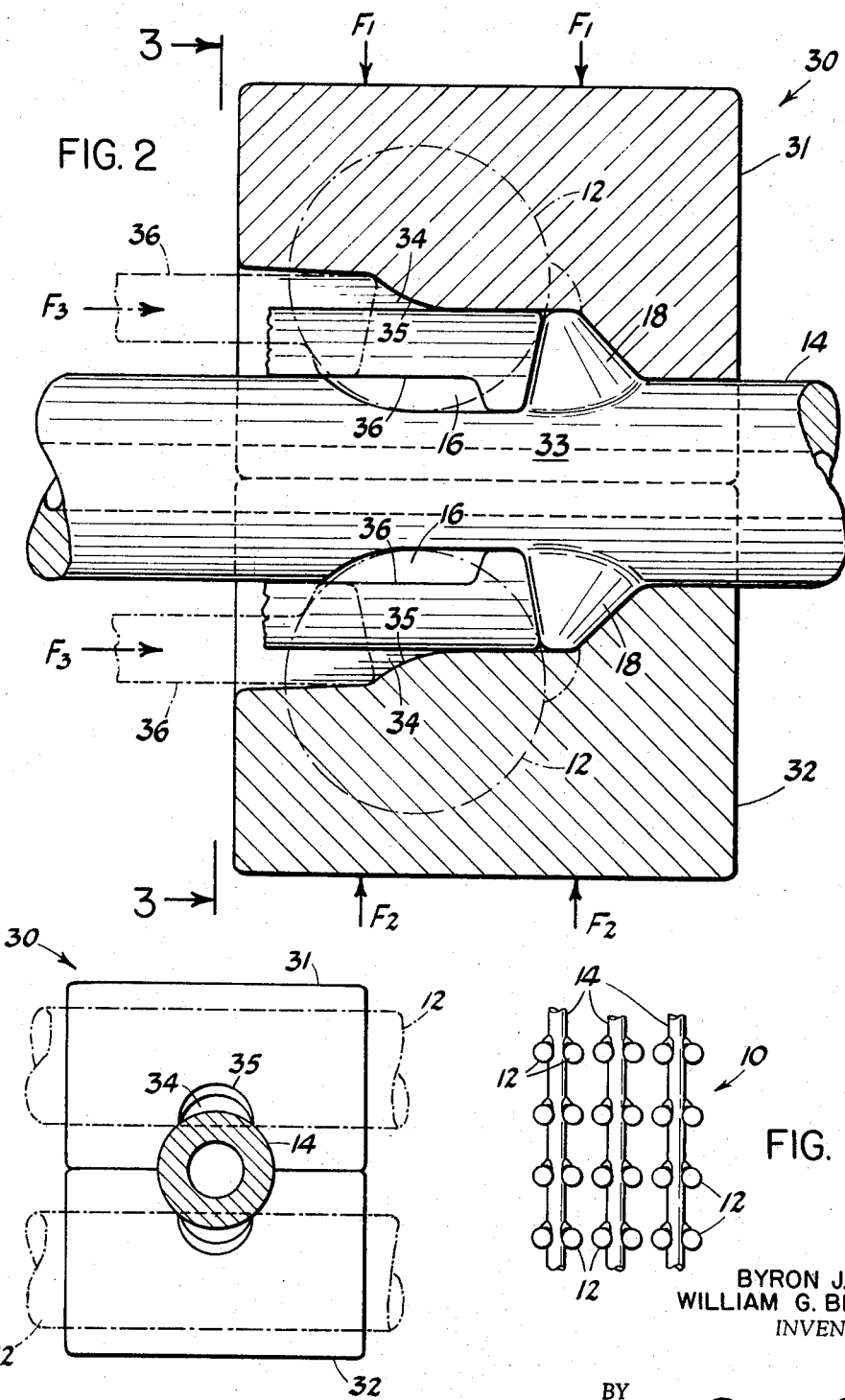

3,354,948
FLUID COOLED TUBE SUPPORT AND METHOD OF MAKING SAME
Byron J. Round, Simsbury, Conn., and William G. Benz, Jr., Signal Mountain, Tenn., assignors to Combustion Engineering, Inc., Windsor, Conn., a corporation of Delaware
Filed Oct. 21, 1965, Ser. No. 500,397
4 Claims. (Cl. 165—67)

ABSTRACT OF THE DISCLOSURE

A welded support for suspending the tubes of a horizontal tube bank from vertical hanger tubes, the material of the extra heavy wall of the vertical tube being extruded to form a depression in the vertical tube and a bulge above the horizontal tube with the horizontal tube residing in the depression. The lip of the bulge is welded to the upper surface of the horizontal tube at a location nearly above the center of gravity of the horizontal tube to reduce the stresses at the weld caused by the bending moment.

---

The invention relates to the supporting of superheaters, reheaters and similar tubular heat exchangers located in high temperature heating gas zones. The invention is particularly concerned with a support which utilizes vertical suspended hanger tubes from which banks of horizontal tubes are supported such as those located in the gas passes of modern steam generators. As an example, a steam generator using supports of this type is shown in FIG. 1 of U.S. Patent 2,308,762, issued to J. Krug et al. on Jan. 19, 1943.

Various means have been employed in the past to support the horizontal legs of tube panels on vertical hanger tubes. These means can be divided into two groups. In one group use is made of U-bolts, brackets, clamps, etc. to attach the horizontal tubes to the vertical hanger tubes. The other group with which the present invention is specifically concerned, employs a welding technique in fastening the horizontal tubes to the hanger tubes.

Two types of supports of the latter group have found general application.

In one support, the horizontal tube, while in contact with the vertical hanger tube, is united therewith by laying a weld bead around and as close as possible to the single point of contact made between the tubes. While this method seems to have the advantage of simplicity, it presents a serious problem of accessibility with regard to welding, since it is very difficult for the welder to strike an arc within the narrow crotch formed by the tubes without damaging the tubes by undercutting the tube wall. Such undercutting may not be detected until the tube rows of the heat exchanger are completely assembled and pressure and heat has been applied. At this time repair of the damage is virtually impossible without costly dis-assembling of the tube bank. Furthermore, since in this method the horizontal tube is supported from its side the weld is subject to stresses caused by a high bending moment due to the weight of the tube acting on a relatively long moment arm. This type of support therefore is generally characterized by a high percentage of failures.

The second type of support also using a welding technique overcomes these disadvantages to a limited degree by increasing the wall thickness of the hanger tube to permit broaching of the tube wall and to provide a larger contact area between the horizontal tube and the hanger tube for welding. However, in this method while accessibility is improved the danger still persists in undercutting the tube wall. Furthermore the weld is still subject to considerable stress due to a high bending moment.

The present invention offers a ready solution to these problems by offsetting part of the wall metal of the hanger tube to form a depression in the wall for receiving a substantial portion of the horizontal tube contour. The metal in forming the depression is being displaced to the upper rim of the depression to produce a bulge or lip which protrudes from the hanger tube wall and which extends over a large upper portion of the surface of the horizontal tube. A readily accessible overhang of metal is thus formed to which the horizontal tube is welded. In this manner the support from which the horizontal tube is suspended has now moved to a point located more nearly above the center of gravity of the tube. Accordingly the weld is subject to only minor bending stresses while accessibility for welding is substantially improved. Furthermore a wider weld can be applied when welding to the lip or bulge, without invading the body of the hanger tube wall, which already is subject to stresses due to internal pressure and due to load.

It is accordingly an important object of the invention to improve the accessibility for making welds and thereby improve their quality when welding horizontal tubes to vertical hanger tubes in tubular heat exchangers that are exposed to a high temperature gas stream.

It is an additional object of the invention to reduce the stress to which these welds are exposed by placing the welded support point more nearly above the center of gravity of the supported horizontal tube section.

A still further object of the invention is a method and apparatus for upsetting part of the wall metal of hanger tubes by extruding metal from the wall to form a depression in the wall and to force the extruded metal to the rim of the depression, thereby to form a bulge of desired shape.

Other objects and advantages of the invention will become apparent from the following description of an illustrative embodiment thereof when taken in conjunction with the accompanying drawings wherein:

FIG. 1 is an elevational section through a horizontal tube bank or tube bundle which is supported from vertical hanger tubes;

FIG. 2 is a section through a split die block surrounding a hanger tube and having a guiding cavity for guiding a ram in extruding metal from the wall of the hanger tube, and for forcing this metal into a cavity to form a bulge of desired shape;

FIG. 3 is a cross section at line 3—3 of FIG. 2, with the ram being omitted for sake of clarity;

FIG. 4 shows a hanger tube portion from which four horizontal tubes are suspended in the manner disclosed by the invention; and FIG. 5 shows a slide elevation of the hanger tube support shown in FIG. 4.

Referring now to the drawings wherein like reference characters are used throughout to designate like elements, the illustrative and preferred embodiment of the invention depicted therein includes a tube bank 10 composed of a multiplicity of horizontal tubes 12 arranged in parallel vertical rows. The tubes 12 of each adjacent two vertical rows are supported from a hanger tube 14 as shown in enlarged views FIGS. 4 and 5. By means of a method and apparatus to be described hereinafter as the description hereof proceeds, metal is extruded from area 16 of the hanger tube wall to produce a depression or saddle therein for receiving a large part of the contour of tube 12. The extruded metal is displaced to form a bulge or lip 18 which extends radially from the tube wall.

This bulge 18 overlaps a large portion of the upper surface of tube 12, with tube 12 being welded thereto by a weld 20. As shown in FIG. 4 the area on bulge 18 from which tube 12 is suspended is located very nearly directly above the center of gravity 22 of the cross section of tube 12. Accordingly weld 20 is subject only to minor stresses caused by the bending moment produced by gravitational forces which act on tube 12. Furthermore, as can be observed from FIGS. 4, 5 and 6, the bulge 18 is easily accessible for making weld 20, with the additional advantage that weld 20 can be made of considerable width without encroaching on the basic wall thickness of hanger tube 14.

The apparatus and method for producing the desired deformation of the wall of hanger tube 14 will now be described.

Referring to FIGS. 2 and 3, a split die block 30 comprising an upper half 31 and a lower half 32 is mounted on the tube section 33 that is to be worked. This section 33 of the tube has previously been locally heated such as, for example, by induction heating to a forging temperature, to render the outer metal layer of the tube wall plastic, while the interior of the tube is cooled to retain rigidity thereof. The upper die half 31 as well as the lower die half 32 have incorporated therein a cavity 34 which has a curved surface 35 for guiding a ram 36 into the heated metal layer of the tube wall to produce a depression 16 large enough to receive a substantial portion of the tube 12 contour.

While clamping forces F1 and F2 are applied to the die block halves 31 and 32 to fixedly secure the die block halves with respect to the tube section 33, ram 36 is driven into cavity 34 along guiding surface 35 by applying force F3 so as to extrude metal from the wall, thereby producing depression 16. The extruded metal is deposited at the far end of cavity 34 to form bulge or lip 18. This far end of cavity 34 into which the metal is forced is shaped to the predetermined desired shape of bulge 18.

From the above it can readily be seen that bulge 18 in cooperation with depression 16 provides a support which permits tubes 12 to be suspended from a point very nearly directly above the center of gravity of tube 12. Weld 20 is therefore not subject to twisting or bending forces but only to a straight downward gravitational pull.

Furthermore weld 20 can be broadened considerably without thereby cutting into the wall of hanger tube 14. Accordingly the tensional stress per square inch of weld 20 is thereby greatly reduced as employed in the hereinabove described tube support structure.

While we have illustrated and described a preferred embodiment of our invention, it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

We claim:

1. A hanger support for supporting at least one tubular element within a high temperature zone, comprising an upright fluid cooled hanger tube, said tubular element arranged adjacently thereto in a generally horizontal position; a depression forming a cradle in the wall of said hanger tube for receiving a portion of the contour of said element; a bulge formed directly above said depression, said bulge being produced from the material displaced to form said depression, and extending a substantial distance over the upper part of said tubular element; and a weld uniting said bulge with said upper part to suspend said element from said bulge.

2. A hanger support as defined in claim 1 in which said hanger tube is provided with a multiplicity of depressions and corresponding bulges in longitudinally spaced relation on opposing sides of said hanger tube to support a plurality of tubular elements.

3. The method of supporting at least one generally horizontal tubular element within a high temperature zone from a upright fluid cooled hanger tube comprising the steps of:

(a) displacing material upwardly in the part of the wall of said hanger tube that is adjacent to said tubular element to form a depression in said wall to receive a portion of the contour of said element;

(b) forming a bulge of said displaced material directly above said depression to overlap the upper part of said tubular element; and (c) welding said bulge to said element to suspend said element from said bulge.

4. The method as defined in claim 3 with the additional steps of forming a multiplicity of depressions and corresponding bulges on opposing sides of said hanger tube in vertically spaced relation, and supporting a plurality of tubular elements therefrom by welding the upper part of each of said elements to a respective bulge.

References Cited
UNITED STATES PATENTS

| | | | |
|---|---|---|---|
| 2,893,698 | 7/1959 | Nunninghoff | 165—162 |
| 3,286,767 | 11/1966 | Evans | 165—162 |

ROBERT A. O'LEARY, *Primary Examiner.*

CHARLES SUKALO, *Examiner.*